United States Patent [19]

Starling

[11] 4,034,834
[45] July 12, 1977

[54] FLOATING PIN RETRACTORS FOR CLUTCH PISTONS

[75] Inventor: James G. Starling, Peoria, Ill.

[73] Assignee: Caterpillar Tractor Co., Peoria, Ill.

[21] Appl. No.: 653,180

[22] Filed: Jan. 28, 1976

[51] Int. Cl.² .................................... F16D 25/00
[52] U.S. Cl. ..................... 192/85 AA; 403/353; 192/70.28; 92/130 D; 188/72.4
[58] Field of Search ........ 192/85 AA, 70.28, 70.19; 92/135, 130 C, 130 D, 165, 165 PR; 188/72.3, 72.4

[56] References Cited

U.S. PATENT DOCUMENTS

| | | | |
|---|---|---|---|
| 2,002,367 | 5/1935 | Fahrney | 192/85 AA |
| 2,240,219 | 4/1941 | Lambert | 188/72.4 X |
| 2,511,520 | 6/1950 | Walton | 192/85 AA |
| 2,596,556 | 5/1952 | Hollerith | 188/72.4 |
| 2,885,033 | 5/1959 | Albright | 192/85 AA X |
| 3,199,646 | 8/1965 | McBride | 192/85 AA X |
| 3,768,603 | 10/1973 | Hoffman | 188/72.3 |

*Primary Examiner*—Benjamin W. Wyche
*Attorney, Agent, or Firm*—Phillips, Moore, Weissenberger, Lempio & Majestic

[57] ABSTRACT

A rotating clutch assembly has an annular axially movable clutch piston for engaging and disengaging the clutch. The piston is moved in one direction by means of fluid under pressure and in an opposite direction under the influence of spring-biased retractor pins. The annular piston is mounted within a housing member and a plurality of the retractor pins transpierce the housing member and engage the annular piston in free-floating, self-aligning disposition. The annular piston is equipped with a plurality of enlarged slots and recesses and the retractor pins are each equipped with an enlarged shoulder portion adapted to be loosely received within the recesses of the annular piston. Assembly of the piston in the housing member is greatly facilitated in that alignment of the retractor pins within the receiving slots of the piston is non-critical and self-adjusting.

5 Claims, 3 Drawing Figures

FLOATING PIN RETRACTORS FOR CLUTCH PISTONS

BACKGROUND OF THE INVENTION

The present invention relates to a rotating clutch assembly utilizable in a marine gearing system or the like. In particular, the invention relates to the utilization of spring retractors for positioning the annular piston of such a clutch. such retractor means in the present invention are self-aligning and free-floating within the piston to make installation and disassembly of the piston from its housing member facile and economical.

A rotating clutch of the type utilized in marine gearing systems includes a large axially movable annular piston, which, upon actuation, causes the engagement or disengagement of a plurality of clutch plates and discs. In the past, such pistons were moved axially in a first direction by means of fluid pressure and in an opposite direction mechanically by means of the plurality of spring-biased retractor pins which were threaded or press-fitted into the piston and which extend through the housing means for such piston. Such a prior art system is shown in prior copending application Ser. No. 488,746 of Gunter W. Schulz, filed July 14, 1974, entitled MARINE GEAR ASSEMBLY and assigned to the Assignee of the present application.

Prior art systems are susceptible to two problems which are obviated by the present invention. First, upon the installation of the annular piston within its housing member, which may be a transfer gear or the like, the threaded or press-fitted retractor pins require an almost perfect positional relationship between the elements so that an entire plurality of such pins may be simultaneously aligned and fitted through receiving apertures of the housing member. This adds to initial costs and complicates repairs and maintenance. Secondly, when in operation, the free axial movement of the piston within the housing member has required a precise fixed alignment of the plurality of pins to prevent binding or sluggish response.

SUMMARY OF THE INVENTION

The present invention alleviates both of the problems discussed above by replacing the threaded or press-fitted type spring retractors with free-floating retractor means which include a plurality of sealed pins each equipped with an enlarged shoulder or head portion which fits into slots and recesses formed in the piston to permit free-floating lateral movement of the pins within the piston such that the piston need only be aligned with respect to the receiving bore in the housing member. Critical regard for the disposition of the retractor means within the piston is not required.

In one form the instant invention may comprise a clutch assembly for a marine gearing system or the like having a piston mounted within a housing member for axial movement relative to clutch discs. The piston is moved in first direction by means of fluid under pressure and in the second direction by means of a plurality of spring retractors which are disposed in free-floating relationship with respect to the piston and which include enlarged shoulder portions adapted to be loosely received with recess means formed within the piston. Each such free-floating spring retractor is equipped with spring-biasing means for mechanically urging movement of the piston towards a predetermined axial position.

One object of the present invention is to provide a disc-type clutch wherein alignment difficulties during assembly and reassembly and during use due to the fit of the piston retractor means into the supporting structures are alleviated.

Another object of the present invention is to provide a disc-type clutch having an annular piston in which are disposed a plurality of self-aligning, free-floating spring retractors.

A further object of the present invention is to provide a retractor pin arrangement for an annular clutch piston wherein the retractor pins are equipped with an enlarged shoulder portion adapted to be loosely received within recesses formed within the clutch piston to alleviate manufacturing and repair problems.

Other objects and advantages of the present invention will become apparent from the following drawings and description.

BRIEF DESCRIPTION OF THE DRAWINGS

FIG. 3 is a sectional view taken along the line III—III of FIG. 2.

DESCRIPTION OF THE PREFERRED EMBODIMENT

Figure 1:
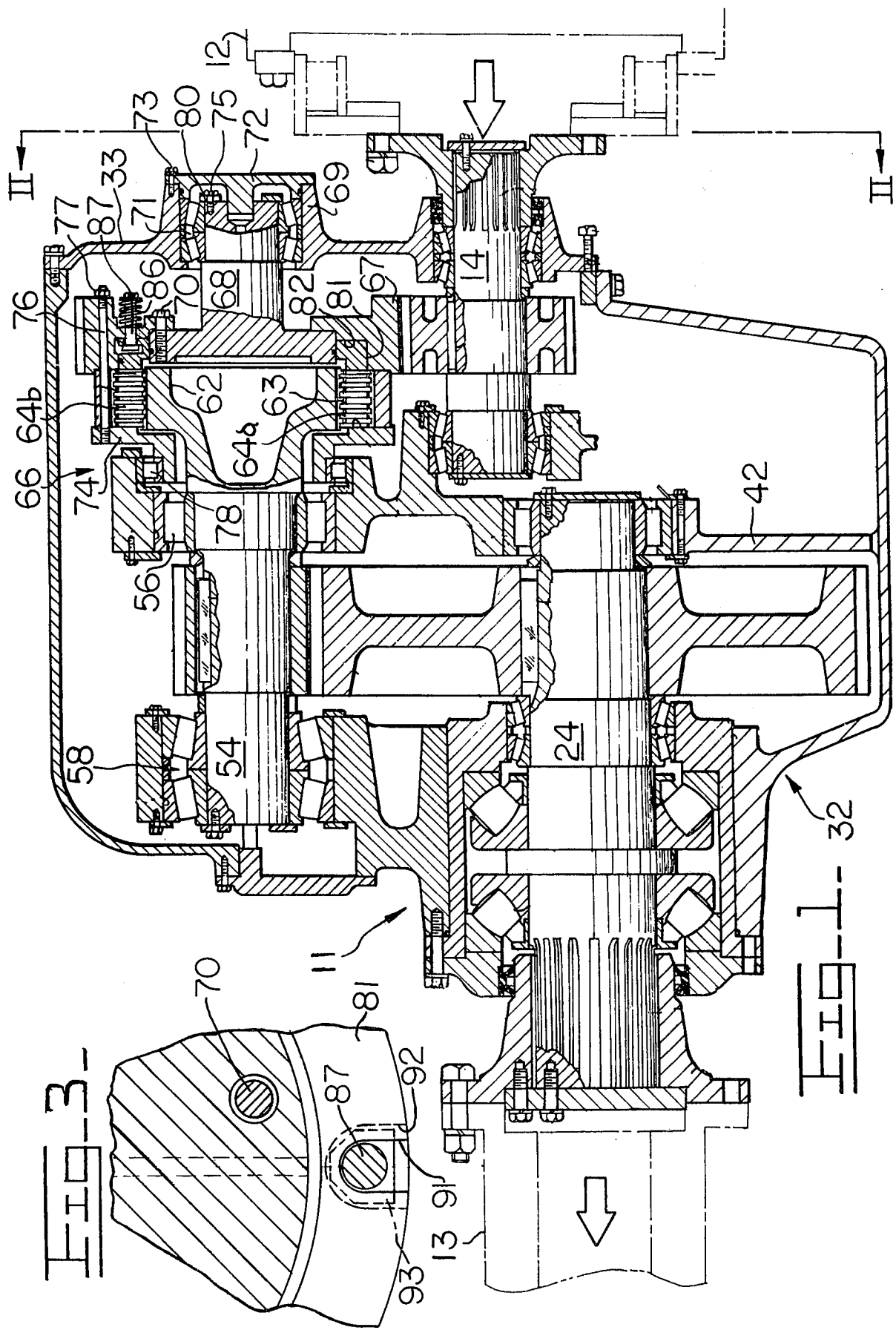
FIG. 1 is a sectional elevation view of a marine gearing system having a clutch equipped with piston retractors in accordance with the present invention.

With reference to FIG. 1 of the drawings, the inventive clutch piston retractors may be more readily appreciated by briefly considering a typical operative context. A marine gearing system is utilized for illustrative purposes. The details of the marine gear assembly of FIG. 1, other than those of the present free-floating retractor pins, are described in the aforementioned related U.S. patent application Ser. No. 488,746 (now U.S. Pat. No. 3,952,606). To facilitate understanding of the present invention, the major components of such a marine gear assembly will be herein described.

The marine gear assembly, shown generally at 11, is adapted to be coupled between a flywheel 12 and propeller shaft 13 of a marine craft for transmitting torque to propeller shaft. The assembly includes an input shaft 14 coupled with the flywheel by means of a suitable coupling. The assembly also includes an output shaft 24 spaced axially from the input shaft and disposed for rotation along an axis parallel to that of the input shaft but at a slightly lower level (as shown in the drawing). The output shaft is coupled with the propeller shaft by suitable rotational coupling means.

The components of the gearing assembly, except for protruding portions of the input and output shafts and the couplings therefor, are enclosed within a housing 32. such housing has a removable forward end closure member 33.

In one mode of operation, torque is transmitted from the input shaft 14 to the output shaft 24 via a spaced-apart parallel countershaft 54. The countershaft 54 is journaled within a bearing 56 in one portion of the housing and within a thrust bearing assembly 58 at another portion thereof. The forward end 62 of such countershaft is equipped with splines 63 which are engaged by alternate ones of the plurality of axially spaced-apart annular clutch plates 64a disposed coaxially upon the countershaft 54 which plates are constrained to rotate the splines. Clutch plates 64a are part of the forward drive clutch assembly 66 for selectively causing the countershaft 54 to rotate with a transfer gear 67. The transfer gear 67 serves as a housing for an annular clutch piston 81, described more fully hereinafter. Bolts 70 secure transfer gear 67 to a rotary axle element 68 which is coaxial with countershaft 54 and which extends forwardly into a sleeve 69 formed in end closure member 33. The forward end of the axle 68 is supported within sleeve 69 by means of an annular bearing assembly 71 which assembly is retained within the sleeve by a circular end cap 72 secured by bolt means 73. A retainer ring 80 is fastened to the front end of the axle 68 by means of bolts 75 to constrain it from axial movement.

A stepped annular clutch member 74 is secured to the transfer gear 67 in coaxial relationship thereto by means of studs 76 having threaded nuts 77 on the forward ends thereof. Clutch member 74 extends rearwardly from transfer gear 67 and is journaled in a support member 42 by means of a bearing 78. The clutch member encloses the plurality of clutch plates 64a and forms an annular surface against which the plates may be axially compressed by leftward movement (as shown in FIG. 1) of an annular clutch piston 81 which is disposed within a conforming chamber formed by a portion of the transfer gear 67 which thus also functions as a piston housing member. A plurality of annular clutch discs 64b are disposed alternately with respect to the plurality of plates and such discs engage splined portions of the clutch member 74. Movement of piston 81 towards the clutch discs and plates may be controlled conveniently by the admission of pressurized fluid into a chamber 82 via conventional conduit and control means.

When the piston 81 is caused to move leftwardly to compress the clutch plates against the discs, rotary motion of the transfer gear 67 is transmitted to the countershaft 54. In the absence of pressure in the chamber 82, the clutch remains fully disengaged and is retained in such disposition by means of retractor springs 86 which act against the head portions of the retractor pins 87 of the present invention. Such retractor pins transpierce the housing member 67 and act against the piston 81 to urge such piston rightwardly as shown in FIG. 1.

Figure 2:
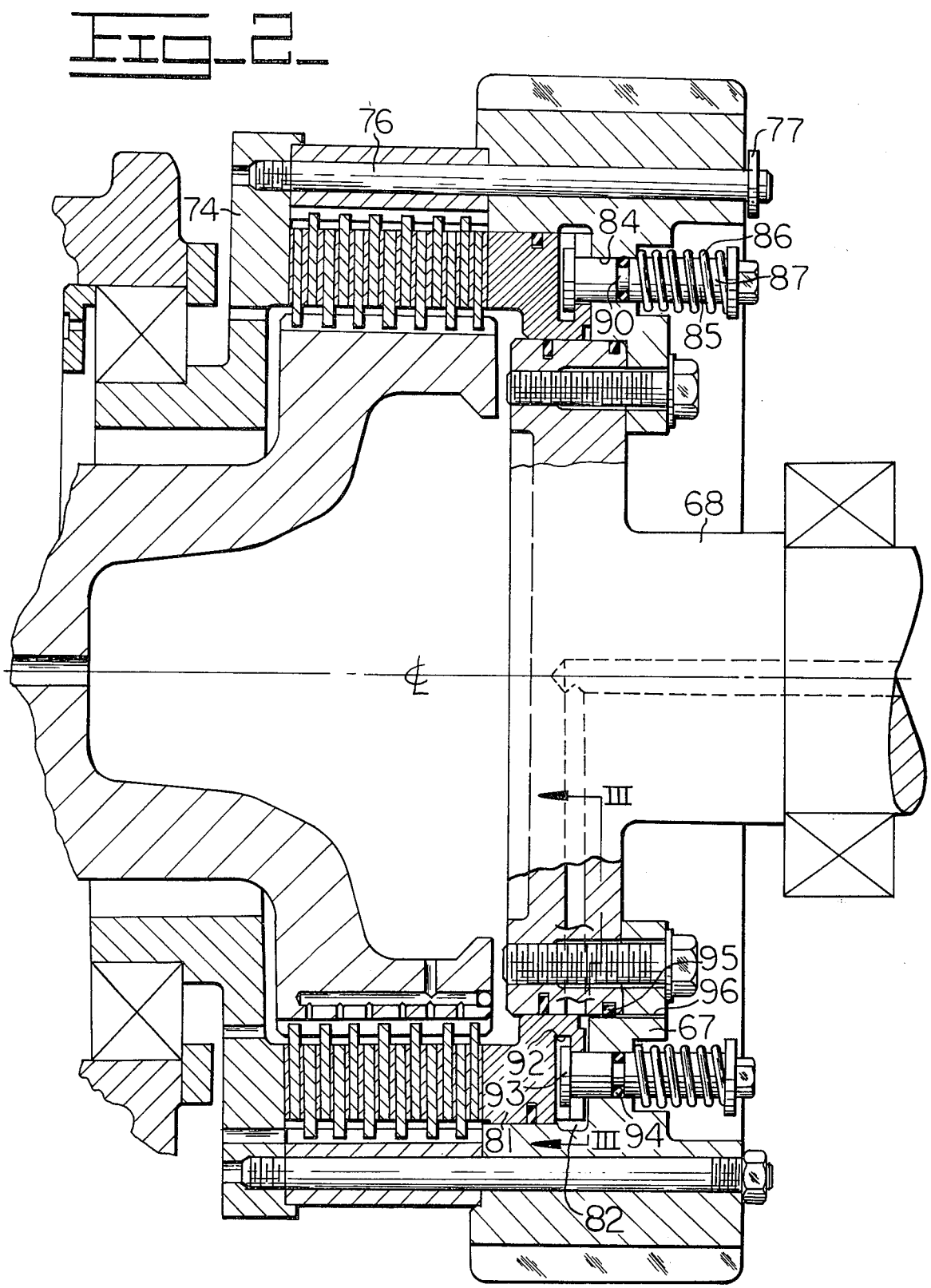
FIG. 2 is an enlarged section view of the clutch region of the marine gear of FIG. 1 more clearly illustrating details of the clutch and retractor system.

The construction and disposition of the retractor pins and the manner in which they cooperate with the piston 81 may be seen in more detail by reference to FIGS. 2 and 3 of the drawings. The retractor pins 87, which are self-aligning, each comprise an elongated shank portion 85 about which one of the coil springs 86 or like biasing means is disposed in coaxial relationship. The shank portion is interrupted by a grooved seal retaining portion 90 of reduced cross-section which receives and axially retains an elastomeric annular seal element 94. The diameter of the shank portion is substantially less than that of the pin retaining bore 84 in the housing member 67 so that axial movement of the retractor pin 87 within the bore 84 is not impeded. Disposed upon a leftward end portion of each retractor pin 87 is a flat plate-like shoulder means 93 which is adapted to be received within an associated one of a series of enlarged recesses 92 in the piston 81. It will be noted from FIG. 2 that recesses 92 are substantially larger than the shoulder members 93 of the retractor pins and that each such shoulder member is therefore capable of a limited amount of movement relative to the clutch piston.

With particular reference to FIG. 3, it will be noted that the piston 81 is also provided with an elongated slot 91 adjacent each recess 92 for loosely receiving the shank portions of the retractor pins 87. The configuration of the recesses 92 may also be readily appreciated by an inspection of FIG. 3. It will be noted that due to the loose fit between the shoulder portions 93 of the retractor pins 87 and the recesses 92 of the piston 81, no special alignment procedures are required for installing the piston and retractor pins within the transfer gear or housing member 67.

Another highly useful feature of the present clutch construction is readily appreciated by reference to FIG. 2. With the chamber 82 periodically filled and emptied of pressurized fluid and in the absence of corrective measures, fluid leakage past seal 95 could cause a pressure build-up behind the seal which can in extreme cases actually cause breakage of bolts 95. This is avoided by one or more relief passages 96 between the hub portion and the tooth ring of the transfer gear 67.

It may be readily seen that the present invention provides an efficient and readily assemblable clutch piston system in which the fitting or alignment of the piston within its housing member is not critical. The free-floating retractor pins allow a great degree of manufacturing tolerance which reduces labor and maintenance costs.

Although the invention has been described with reference to a particular preferred embodiment, it will be apparent to those skilled in the art that many variations and modifications are possible within the spirit of the inventive concept. No limitation is intended with respect to such variations and modifications except those implicit in the scope of the appended claims.

What is claimed is:

1. A clutch assembly for receiving and selectively transmitting rotary drive comprising:
    axially spaced drive input and output rotary members, one of said rotary members having a plurality of angularly spaced-apart axially directed bores therethrough,
    a plurality of clutch discs disposed between said rotary members, at least one of said discs being constrained to rotate with said one rotary member and at least one other of said discs being constrained to rotate with the other of said rotary members,
    a clutch piston disposed between said one rotary member and said clutch discs for axial movement relative thereto, wherein said piston has a plurality of radially extending recesses opening at the peripheral surface of the piston and has radially extending slots each being adjacent one of said recesses and being of lesser width than the adjacent recess,
    means for selectively urging said clutch piston towards said discs to engage said clutch assembly,
    a plurality of retractor pins each extending through an associated one of said bores of said one rotary member and being axially movable therein, each of said pins being capable of limited sideward movement relative to said piston while having means for forcibly withdrawing said piston from said discs upon axial movement of said pins away from said discs, wherein each of said retractor pins extends into a separate one of said recesses through the adjacent one of said slots and has an end within said one of said recesses of greater width than said adjacent slot, and resilient means for exerting a force on said pins which tends to draw said piston away from said discs.

2. The combination defined in claim 1 wherein said end of each of said pins is of less width than said recess in which said end of said pin is situated and wherein said slots are of greater width than the portions of said pins which extend therethrough.

3. A clutch assembly for a marine gear having first and second aligned axially spaced shaft sections between which rotary drive is selectively transmitted by said clutch assembly comprising:

a gear disposed coaxially on said first shaft and secured thereto for rotation therewith, said gear having an annular chamber formed therein adjacent said first shaft and facing said second shaft and being transpierced by a plurality of bores extending in the axial direction within said gear and communicating with said chamber thereof, an annular clutch piston disposed in said chamber for axial movement therein, a plurality of clutch plates disposed coaxially between said piston and said second shaft, means for admitting pressurized fluid to said chamber of said gear to force said piston towards said clutch plates and said second shaft, a plurality of retractor pins each extending through one of said bores of said gear and each being loosely coupled to said clutch piston within said chamber and a plurality of springs, each being disposed coaxially around a separate one of said retractor pins on the opposite side of said gear from said chamber to exert a force on said pins tending to draw said piston away from said clutch plates and said first shaft, a first plurality of annular elastomeric sealing elements each being disposed in a separate one of said axial bores of said gear in coaxial relationship with a separate one of said pins, at least one second annular elastomeric seal disposed in coaxial relationship between said gear and said first shaft, and means forming a pressurized fluid relief passage communicating with the side of said second seal which is opposite from said chamber.

4. A clutch assembly for a marine gear having first and second aligned axially spaced shaft sections between which rotary drive is selectively transmitted by said clutch assembly comprising:

a gear disposed coaxially on said first shaft and secured thereto for rotation therewith, said gear having an annular chamber formed therein adjacent said first shaft and facing said second shaft and being transpierced by a plurality of bores extending in the axial direction within said gear and communicating with said chamber thereof, an annular clutch piston disposed in said chamber for axial movement therein, wherein said piston has a plurality of recesses extending radially inward from a circumferential surface thereof and has radially extending slots each being adjacent a separate one of said recesses, a plurality of clutch plates disposed coaxially between said piston and said second shaft, means for admitting pressurized fluid to said chamber of said gear to force said piston towards said clutch plates and said second shaft, a plurality of retractor pins each extending through one of said bores of said gear and each being loosely coupled to said clutch piston within said chamber, one end of each of said retractor pins extending into an associated one of said recesses through the adjacent one of said slots and having an enlargement within said associated recess whereby axial movement of said retractor pins away from said clutch plates draws said piston away therefrom, and a plurality of springs, each being disposed coaxially around a separate one of said retractor pins on the opposite side of said gear from said chamber to exert a force on said pins tending to draw said piston away from said clutch plates and said first shaft.

5. A clutch assembly as defined in claim 4 wherein said recesses of said piston are broader than said enlargements of said retractor pins and wherein said slots of said piston are broader than the portions of said pins which extend therethrough but narrower than enlargements of said pins.

* * * * *